ACOUSTIC SURFACE WAVE DEVICE

Filed July 6, 1967

INVENTOR:
Gerold E. Pokorny
By Ronald M. Goldman
ATTORNEY

United States Patent Office
3,479,572
Patented Nov. 18, 1969

3,479,572

ACOUSTIC SURFACE WAVE DEVICE

Gerold E. Pokorny, San Mateo, Calif., assignor to Litton Precision Products, Inc., San Carlos, Calif., a corporation of Delaware Filed July 6, 1967, Ser. No. 651,510
Int. Cl. H01l 11/00, 15/00
U.S. Cl. 317—235 4 Claims

ABSTRACT OF THE DISCLOSURE

A multitaped acoustic delay line uses an acoustic surface wave for permitting multiple spaced outputs. Input signals, for example, of high or microwave frequency are converted into an acoustic surface wave which travels along the surface of a piezoelectric medium at acoustic velocities. Each of a plurality of spaced transducers coupled to the medium detects the acoustic wave and converts it back into an electrical signal of the same frequency. Compatible with intgerated circuits, the delay line is integral with a plurality of spaced semiconductor switches in one embodiment.

Figure 1:
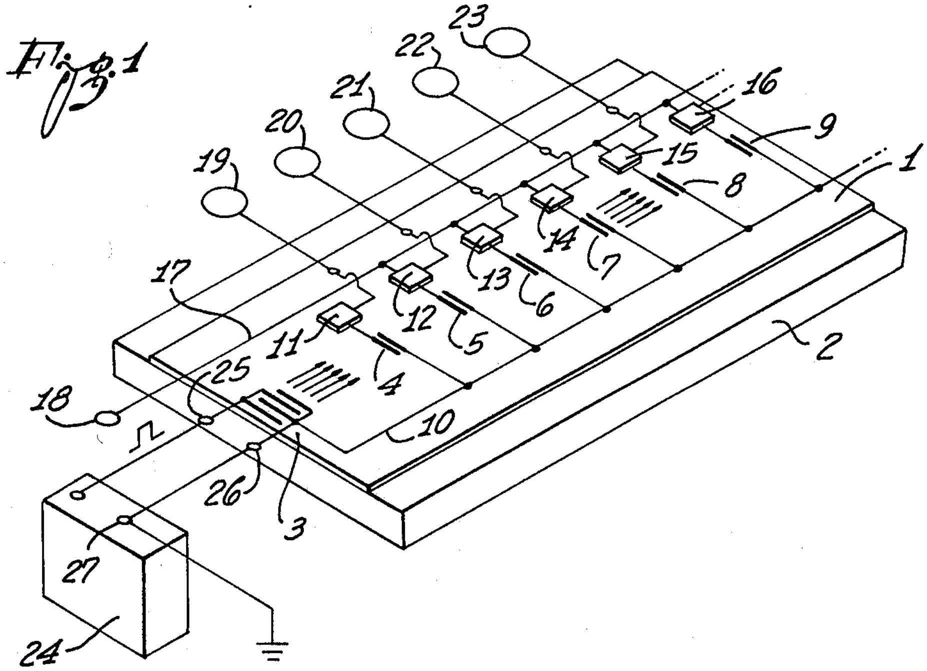

This invention relates to a device which provides at least one output signal a predetermined period of time subsequent to the application of an input signal, and more particularly, to a device termed a multitaped delay line or scanning switch in which an input signal is converted into an acoustic surface wave that travels along the surface of a medium to one or more spaced output positions.

Delay devices or lines containing multiple outputs are presently used in many well-known systems that require one or more signals to be separated by a precise increment of time. In those systems such a device allows selection of the desired incremental delay through a circuit connection to the appropriate output tap of the delay line. Moreover, still different systems use multiple output delay devices as scanning switches. Therein each output of a plural output delay line is connected to a particular corresponding gate in a matrix. Subsequent to application of an input signal to the device each gate is momentarily and sequentially energized from its respective output connection to the delay line. Applications for the latter exist in scanning light sensor matrices found in solid state television and large area displays and in infrared, microwave, millimeter and ultrasonic sensor matrices.

To provide such time delays or scanning, acoustic lines appear to be peculiarly desirable. Due to the relatively slow velocity of acoustic waves, the switching speed between gating points in the matrix can be chosen by simply changing the length of the acoustic path between them. Additionally, because the trigger signal is acoustic and the signal to be gated or switched is electric improved isolation between trigger, gating, and sensor circuits, especially important in miniaturized or integrated circuitry, is obtainable.

Heretofore, magnetostrictive types of delay lines afforded multiple outputs useful for the foregoing purposes. However, they present some peculiar disadvantages.

For example, magnetostrictive delay lines possess dispersive properties. That is, the velocity with which an acoustic wave is transmitted along the magnetostrictive wire is dependent upon the frequency of the acoustic wave. In a nondispersive medium the velocity of such wave propagation is a constant. Hence, with the dispersive magnetostrictive medium, a signal or signals applied to the input which includes a number of frequencies is not faithfully reproduced at the output of the delay line and compensation requiring additional circuitry may be required.

Secondly, magnetostrictive delay lines are not linear. As an A.C. input signal goes through its positive and negative half cycles, each half cycle of the signal causes the same motion of the line. At the output, negative and positive half cycles of input signals cannot be distinguished and, hence, the line effectively doubles the input frequency. Accordingly, to prevent frequency doubling all such delay lines require biasing magnets to provide an initial reference magnetization. Inasmuch as biasing magnets are required, the bulk of magnets and their stray fields are not compatible with construction and packaging used with integrated circuits.

Piezoelectric materials have heretofore been used in a delay line or device as the element which propagates the acoustic wave. However, all such prior piezoelectric devices depended for operation upon the propagation of acoustic waves through the bulk of the piezoelectric material or "bulk acoustic waves." This requires the input transducer to be located at one boundary and an output transducer to be located at the other boundary in order to be accessible as illustrated in a recently issued U.S. Patent 3,311,854 of W. P. Mason. This construction does not lend itself readily to providing multiple outputs.

As illustrated in a recent U.S. Patent 3,310,761 to J. B. Brauer, some attempts have been made to use the bulk acoustic wave transmitted through the body of crystal for providing multiple outputs. As a practical matter however, this possesses obvious electrical and mechanical disadvantages.

Thirdly, both prior art piezoelectric and magnetostrictive delay lines use for their operation the propagation of an acoustic bulk wave. Because of this, as the frequency of the input signal is raised or the dimensions of those delay lines are reduced or "miniaturized" so that the width of the material approaches the wavelength of the input frequency, internal reflections of the acoustic waves between the surfaces of the propagating medium results in the departure of the operating characteristics from that of a pure bulk wave to complex modes of waves which results from the interferences between the bulk waves reflected from the boundaries. This is described as "moding."

Therefore, it is an object of this invention to provide a novel acoustic delay line.

It is an additional object of the invention to provide a novel acoustic scanning switch.

It is a further object of the invention to provide a delay line or scanning switch which does not have the undesirable effects of a dispersive medium.

It is another object of the invention to provide a multiple output piezoelectric delay device which does not rely upon the bulk wave or possess undesirable "moding."

It is a further object of the invention to provide a delay device having a construction that lends itself to miniaturization and integrated circuit techniques.

Briefly stated, the invention includes a piezoelectric medium or layer for permitting acoustic waves to travel along the surface thereof. An input transducer is attached to the surface of the piezoelectric layer for converting electrical input signals into an acoustic surface wave which travels along the piezoelectric layer. Additionally, one or more output transducers are attached to the surface of the medium at spaced positions for converting the received portions of the acoustic surface wave into an electrical signal as the acoustic surface wave passes such transducer.

In accordance with another aspect of the invention, the transducers include two hands having a plurality of fingers with the fingers of the hands interdigitally arranged.

In accordance with a further aspect of the invention, the piezoelectric layer forms the channel element for a plurality of spaced field effect transistors and the acoustic surface wave changes the electrical condition of the channel element as it passes each transistor.

Figure 2:
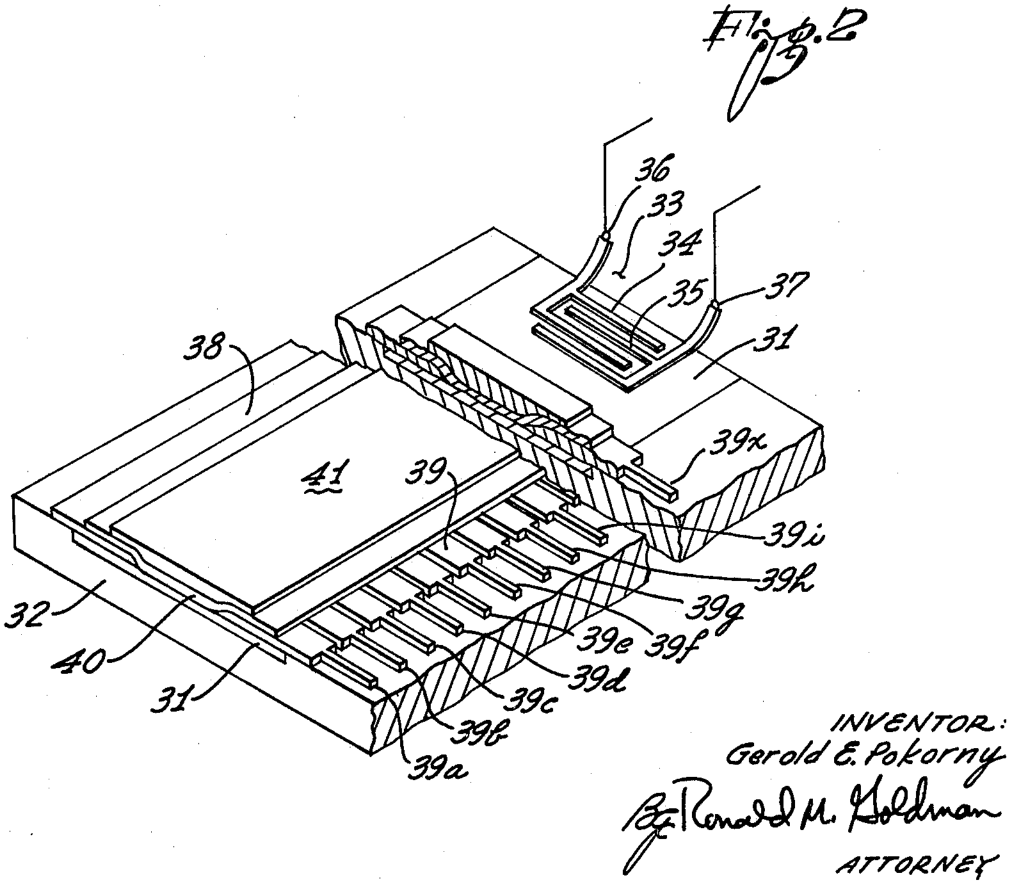

The foregoing and other objects and advantages are readily apparent from consideration of the following detailed description taken together with the figures of the drawings in which:

FIGURE 1 illustrates a multitaped delay line constructed in accordance with the principals of the invention; and FIGURE 2 illustrates a multitaped delay line constructed integrally with a plurality of semiconductor switches in accordance with other principals of the invention.

FIGURE 1 shows a layer of piezoelectric material that is supported upon a base or surface 2 of any suitable insulating material, such as glass, or alumina. This piezoelectric material may consist of any suitable substance such as zinc oxide, ZnO, lithium tantalate, $LiTaO_3$, cadmium sulfide, Cds, cadmium selenide, CdSe, quartz, lithium niobate, $LiNbO_3$, and PZT materials. The layer is highly polished and is electrically polarized, preferably, for best results normal to the surface. An input transducer 3 is attached to piezoelectric layer 1. Advantageously, input transducer 3 is of a construction having two hands with a plurality of parallel interdigitated fingers. Each of these fingers is constructed of a thin layer of conductive material such as aluminum, which is deposited, bonded, or otherwise attached to the piezoelectric layer 1 by conventional techniques.

A plurality of output transducers 4, 5, 6, 7, 8, and 9 are also located on the surface of piezoelectric layer 1, spaced from each other and from input transducer 3. Each of the output transducers illustrated in FIGURE 1 consists of two thin spaced parallel conductive strips such as aluminum bonded or otherwise attached to piezoelectric layer 1.

One strip of each of output transducers 4–9 is electrically connected in a common electrical path 10 which as an example, consists of a metal deposited upon layer 1. In the embodiment, a plurality of semiconductor gates 11, 12, 13, 14, 15, and 16, schematically illustrated, are located upon the surface of piezoelectric layer 1. These semiconductor gates may be constructed in the form of any of the well known thin film field effect transistors having a gate, drain, and source electrodes and deposited upon layer 1 in a conventional manner. The drain electrode of each of the gates is connected in a common electrical path 17 which in turn is connected to an output terminal 18.

A plurality of matrix or array sensor elements 19, 20, 21, 22, and 23 are connected to the source electrode of a corresponding gate. The matrix or array elements may take the form of any conventional sensor or pickup device which is inserted into another electrical circuit for picking up an indication of the condition of that circuit. In binary systems where the condition monitored is either an on or off, a positive or negative voltage is presented through the respective ones of the matrix elements to the corresponding source electrode. The second of each conductive strip in output transducers 4, 5, 6, 7, 8, and 9 is connected to the gate electrode of a corresponding gate so that any signals picked up or detected by the respective output transducer is sufficient to prepare the respective gate for energization by the respective matrix element connected thereto.

A source or pulse generator of electric pulses 24 preferably of high frequency or microwave energy is connected across the input terminals 25 and 26 in order to provide a source of high frequency pulses. One polarity terminal 27 of pulse generator 24 is connected to ground potential and through a lead to terminal 26, to one hand of fingers of the input transducer and to the common electrical lead 10. This places one side of each of the input and output transducers at a common potential.

Source 24 produces pulses in the high frequency or microwave frequency range. These pulses are applied to input transducer 3. Because adjacent fingers of input transducer 3 are oppositely charged, electric fields are established therebetween through the piezoelectric layer. Inasmuch as a piezoelectric material is one in which strain and stress is induced inside the material by the application of an external electric field and, conversly, electric fields are induced inside the medium by application of a mechanical stress to the medium, the electric field established between the fingers induces a stress in the piezoelectric layer 1. The stress so induced causes the propagation or travel of a stress wave along the surface of the material and which is termed an acoustic surface wave.

Analogous to this type of motion is the surface wave which propagates or travels along the surface of the earth in an earthquake or the ripples produced by dropping a body in a pool of water.

As the polarity of the input signal reverses, the electric field between adjacent fingers of the input transducer likewise reverses. Accordingly, because of the nature of the piezoelectric material, the direction of the induced stress also reverses in direction.

This high frequency acoustic wave effectively propagates or travels across the surface of the piezoelectric material. As is known, the velocity of propagation of an acoustic wave is much slower than the velocity with which electromagnetic energy of the same frequency propagates through space and which is essentially at the speed of light. Hence, although the frequency of the signal applied to the input transducer 3 is preferably in the high or microwave frequency range, the velocity of the acoustic surface wave produced by the transducer is much much slower in the piezoelectric medium than the velocity with which an electromagnetic wave of the same frequency travels through space. Consequently, the acoustic wave travels across the surface of piezoelectric layer 1 and passes each of the output transducers 4, 5, 6, 7, 8, and 9, successively, and at predetermined different intervals of time. Because the acoustic wave velocity is slower than an electromagnetic wave, the time intervals available are of greater duration and more workable than available with the latter type of energy.

As the propagating acoustic surface wave passes each output transducer, which in FIGURE 1 consists of two parallel spaced conductive strips, the ripple or alternate crest and trough of the wave front causes one of the conductive strips to rise relative to the other and vice versa, as the wave progresses; analogous to the bobbing of two spaced corks in a lake. Because layer 1 has piezoelectric properties mechanical stress created therein, such as that due to the propagating acoustic wave, are accompanied by the generation of a voltage between points under different mechanical stress. Thus, as one conductive strip in each output transducer is displaced relative to the other by reason of the acoustic surface wave, a potential difference or voltage appears between those strips. Each output transducer therefore converts the detected acoustic wace to an electrical output voltage.

Reference is made to transducer 4 as an example of the operation of the output transducer. The output voltage generated by the piezoelectric material which appears between the fingers is applied to the gate electrode of a corresponding gate 11 to bias or prepare the gate. Any signal introduced to the source electrode by sensor 19 passes through the gate and out upon lead 18. In like manner, as the acoustic wave passes transducer 5, the latter gate samples the condition of sensor 20. If any information represented by a suitable volttge is present at sensor 20, it also passes through the gate and onto lead 18 serially behind any previous signal emitted or passed from gate 11. In like manner, gates 13 through 16 are sequentially prepared and the sensors 21 through 23 are sampled at successive intervals of time. Thus, in this manner of operation the acoustic delay devices perform the function of a scanning switch which scans the condition of a plurality of sensors sequentially and converts that information from a parallel or space-sequential form as it appears at the sensors to a serial or time-sequential form on lead 18.

The smoothness of the piezoelectric layer is significant in that any imperfection or roughness which approaches a wavelength at the frequency of the input signal results in attenuation of this acoustic wave propagated along this surface. Accordingly, the layer 1 is highly polished. Likewise, the thickness of this layer is preferably greater than an acoustic wavelength λ at the frequency $f$ of the signal applied to input transducer 3 where $f\lambda = v$, the acoustic velocity in the piezoelectric layer. If it were smaller, dispersion or moding of the longitudinally propagating wave may result and would cause interference with the acoustic surface wave applied to the surface of the layer.

It is apparent that as the acoustic wave propagates down the surface it becomes more and more attenuated. Such attenuation is caused by the presence of the output transducers themselves and is further caused by any imperfections in the grain of the surface of piezoelectric layer 1. As a practical matter then, this attenuation limits the number of taps or output transducers which can be used in the acoustic device and the length of such device.

To compensate for this attenuation, an amplifier may be coupled to an output transducer to restore the acoustic wave to the level at which it was applied to input transducer 3 and such restored signal is then applied to the input transducer of a second acoustic delay line of the construction illustrated in FIGURE 1. Such addition permits an effectively longer delay line.

It is noted that the embodiment of FIGURE 1 includes elements of scanning switches, it also includes the structure and function of a multitaped delay line. Since there is a finite difference in time between the energization of input transducer 3 and the passage of the acoustic surface wave to each of the successively positioned output transducers 4 through 9, a desired time delay is obtained by coupling an electrical lead directly to the output of the output transducer or, with the gate connected to a source, to the gate connected with that transducer which is spaced from input transducer 3 by the desired time delay.

The spacing S is determined by the simple equation $S = V_S T$ where T is the desired time delay and $V_S$ is the velocity with which the acoustic wave travels along the surface of the piezoelectric material.

The other output transducers are then available, as spare taps, for use in case it is desired to provide a different delay interval.

The acoustic device, as is apparent, is readily constructed using techniques known to microelectronic or integrated circuitry. The piezoelectric layer is polished in a conventional manner and the aluminum strips which form the input and output transducers may conventionally be deposited upon the piezoelectric surface by use of a photographic mask and a photo-resist technique common in the art or by vacuum evaporation techniques.

FIGURE 2 is another embodiment of the invention constructed by means of conventional integrated circuit techniques and in which the output transducers are integral with semiconductor swiches incorporated therein.

An elongated layer 31 of cadmium sulfide, cadmium selenide, or other suitable piezoelectric materials which function as the channel layer in the conventional thin film type field effect transistor is placed upon an insulating substrate 32 of glass or ceramic. The piezoelectric layer 31 is constructed in accordance with the requirements set forth for the layer in FIGURE 1, and moreover, possesses the electrical properties suitable as a functional channel element in conventional thin film field effect transistors. The cadmium sulfide layer 31 extends from one end to the other end of the substrate.

An input transducer 33 is coupled to the piezoelectric layer and consists of two hands of interdigitated conductive fingers 34 and 35 that deposited, bonded, or otherwise attached to the surface of piezoelectric layer 31. In the manner described previously, relative to FIGURE 1, input transducer 33 converts electrical energy applied between input terminals 36 and 37 into an acoustic surface wave that travels along the surface and interface of the piezoelectric layer 31, and the insulating layer 40.

An elongated strip 38 of gold, or other suitable conductor, is deposited over a portion of substrate 32 and cadmium sulfide layer 31. Spaced therefrom across a portion of cadmium sulfide layer 31 is a plurality of small spaced strips 39 of gold or other suitable conductors, which overlay a portion of the piezoelectric layer 31 and the substrate 32. A thin layer of insulating material 40 is located in the space between the gold strip 38 and gold strips 39 bordering the piezoelectric material 31 and overlapping onto each of the strips 38 and 39. Another than layer of gold 41 is located on top of the insulating layer 40.

As is apparent, the construction illustrated, and as is more apparent in the cross-section in FIGURE 1, with the two spaced gold electrodes 38 and 39 partially overlaying a cadmium sulfide layer 31 with an insulating layer 40 separating a third thin gold electrode 41 in overlaying relationship is that of the conventional thin-film type field effect transistor. Accordingly, the thickness and spacing of the elements are determined in accordance with principles conventional for such semiconductor device.

A plurality of such thin film type of field effect transistors is integrated onto the substrate 32 and piezoelectric layer 31 with a common drain and gate electrode.

The gold strip 38 is what is commonly termed drain electrode, and is common to each of the transistor structures; a gate electrode, the gold strip 41, also common to each of the transistor structures; and a plurality of source electrode 39*a*, 39*b* . . . 39*x*, indicated generally as 39. The portion of the cadmium sulfide layer 31 between each source electrode and the drain electrode is commonly termed a channel. And here the channels are physically connected and integral with the elongated piezoelectric layer. Conventional operation of a field effect transistor is described in the literature. In essence, the intensity of the electric field created by application of a voltage to the gate electrode 41 regulates the flow of current between the spaced and properly biased drain and source electrode, 38 and 39, through the channel member 31 therebetween.

The application of the invention as either a delay line having multiple taps or as a scanning switch requires that the gate and drain electrodes be connected electrically in common. Hence, each is formed with a single integral strip. Thus, the single elongated strip 41 serves as the common gate electrode and the single elongated strip 38 serves as the common drain electrode. Alternatively, of course, each transistor electrode can be individually formed and those electrodes are then connected in common with external wires, leads, or strip lines.

Each of the components of the scanning switch illustrated in FIGURE 2 is manufactured with techniques conventional to integrated circuits and which need not be detailed. In such process each of the metals and insulator portions is successively deposited upon the insulating substrate 32.

The drain 38 and gate 41 electrodes are connected through electrical leads, not illustrated, to suitable sources of electrical biasing voltages and output networks are suitably connected therewith. For performing the function of a scanning switch, the respective source electrodes are connected individually to corresponding sensors in a matrix through which they complete an electrical circuit to the source and an output is taken by monitoring current flow to the drain electrode. For operation as a delay line, the source electrodes are individually connected directly to the desired input circuits, and the output is obtained by the current flow through that input circuit effected by conduction of the corresponding field effect transistor.

A source of electrical pulses or pulse generator, not illustrated in this figure, which may suitably be in the high or microwave frequency range is applied between terminals 36 and 37 to the input transducer 33. Transducer 33 in a manner previously discussed converts such electrical energy into an acoustic surface wave which is coupled to and travels along the surface and interface between the piezoelectric, here cadmium sulfide, layer 31 and the insulating film 40. Traveling with an acoustic velocity, V, the wave travels past each of the transistors spaced from the input transducer by individual distances, S, at a time, T, determined in accordance with the equation $S=VT$.

Inasmuch as the traveling acoustic wave is a disturbance or mechanical stress causing crests and troughs similar to a wave along the surface of the piezoelectric medium layer accompanied by electrical potentials inherently created in the piezoelectric material at locations under different stress. As the acoustic wave passes through each portion of the piezoelectric layer 31 between a source electrode 39 and the drain 38, it causes an additional electric field in the region of layer 31 therebetween previously termed the channel.

Assuming the source, gate, and drain electrodes to be properly biased and including an operated sensor, if functioning as a scanning switch, or an input circuit if operating as a delay line, the additional electric field appearing in the channel is sufficient to change the state of the transistor causing it to conduct.

Of course it is understood that this invention is not restricted to the particular details described in the foregoing detailed description since many equivalents become apparent to those skilled in the art. The foregoing embodiments it is understood are presented solely for purposes of illustration and are not intended to limit the invention as defined within the breadth and scope of the appended claims.

What I claim is:

1. A plurality of spaced field effect transistors on a common substrate, each of said field effect transistors having a drain and source electrode spaced apart over a channel, and a gate electrode overlying said channel and spaced therefrom by a layer of insulator material, said channel of each of said transistors comprising an associated portion of a single layer of piezoelectric material which extends in common between all of the plurality of transistors, and transducer means coupled to said layer of piezoelectric material for converting electrical signals at an input into acoustic surface waves which travels along the surface of the layer of piezoelectric material.

2. The invention as defined in claim 1 wherein each of said respective gate electrodes is connected in common and forms an integral strip and wherein each of said respective drain electrodes is connected in common and forms an integral strip.

3. The invention as defined in claim 1 wherein said piezoelectric material further comprises cadium selenide.

4. In combination: a layer of piezoelectric material having a surface capable of sustaining the propagation of an acoustic surface wave; an input transducer for converting electrical signals supplied thereto into an acoustic surface wave coupled to the surface of said layer, whereby an acoustic wave propagates along the surface of said layer at a predetermined velocity and passes various positions on said surface at predetermined times subsequent to initiation by said input transducers; and a plurality of output transducers, each of said output transducers being coupled to the surface of said layer at predetermined positions thereon operatively spaced both from each other and said input transducer; each of said output transducers further comprising a field effect transistor having a drain electrode and a source electrode spaced apart on said piezoelectric layer, an insulator overlying a portion of each of said drain and source electrodes and overlying the space therebetween, and a gate electrode located atop said insulator overlying said space.

References Cited

UNITED STATES PATENTS

| | | | |
|---|---|---|---|
| 3,360,749 | 12/1967 | Sittig | 333—30 |
| 3,300,739 | 1/1967 | Mortley | 333—30 |
| 2,898,477 | 8/1959 | Hoesterey. | |

HERMAN KARL SAALBACH, Primary Examiner

C. BARAFF, Assistant Examiner

U.S. Cl. X.R.

330—5.5; 333—30, 72